United States Patent [19]
Erickson

[11] Patent Number: 5,853,685
[45] Date of Patent: Dec. 29, 1998

[54] PROCESS FOR THE PRODUCTION OF HIGH PURITY SILICA FROM WASTE BY-PRODUCT SILICA AND HYDROGEN FLUORIDE

[76] Inventor: William R. Erickson, 239 Lake Hollingsworth Dr., Lakeland, Fla. 33803

[21] Appl. No.: 705,901

[22] Filed: Aug. 28, 1996

[51] Int. Cl.⁶ .................................................. C01B 33/12
[52] U.S. Cl. ......................... 423/335; 423/340; 423/342; 423/343
[58] Field of Search .................................. 423/335, 342, 423/343, 340

[56] References Cited

U.S. PATENT DOCUMENTS

| | | |
|---|---|---|
| 2,306,021 | 12/1942 | Knowles et al. ........................ 423/340 |
| 2,785,953 | 3/1957 | Fitch . |
| 3,498,746 | 3/1970 | Smaltz et al. . |
| 3,615,195 | 10/1971 | Bierman, Jr. et al. . |
| 3,645,678 | 2/1972 | Parish et al. . |
| 3,645,679 | 2/1972 | Parish et al. . |
| 3,645,680 | 2/1972 | Parish et al. . |
| 3,764,658 | 10/1973 | Darwin et al. . |
| 4,144,158 | 3/1979 | Nagasubramanian et al. . |
| 4,539,187 | 9/1985 | Russ et al. . |
| 4,557,918 | 12/1985 | Lagerstrom et al. .................... 423/340 |
| 4,613,494 | 9/1986 | Barber . |
| 4,915,705 | 4/1990 | Mollere et al. . |
| 4,981,664 | 1/1991 | Chieng . |
| 5,165,907 | 11/1992 | Chieng . |
| 5,180,569 | 1/1993 | Erickson et al. . |

FOREIGN PATENT DOCUMENTS

| | | |
|---|---|---|
| 3545610 | 6/1987 | Germany . |
| 62288110 | 12/1987 | Japan . |

*Primary Examiner*—Paul Marcantoni
*Attorney, Agent, or Firm*—Dowell & Dowell, P.C.

[57] ABSTRACT

High purity silica is obtained by the reaction of impure by-product waste silica with hydrogen fluoride preferably in the presence of water or sulfuric acid, producing silicon tetrafluoride gas and a mother liquor. The silicon tetrafluoride is separated from the mother liquor, which retains the impurities originally contained within the impure silica. The silicon tetrafluoride gas is contacted with high-purity water, in a clean environment, to form a slurry of high purity silica and high-purity hydrofluosilicic acid (FSA). A portion of the silica is filtered from the slurry and washed producing a high purity silica product. The rest of the silica-FSA slurry is preferably reacted with ammonia to form a slurry of ammonium fluoride and silica. The silica is separated from the ammonium fluoride and preferably washed and calcined to remove any remaining ammonium fluoride, leaving additional high purity silica product. The separated ammonium fluoride may be reacted with lime to produce additional products for recycling back into the process. The process can be repeated for further purification of the silica. The process may be used to produce substantially spherical silica particles about 1.0 to about 25.0 microns in diameter.

19 Claims, 2 Drawing Sheets

PROCESS FOR THE PRODUCTION OF HIGH PURITY SILICA FROM WASTE BY-PRODUCT SILICA AND HYDROGEN FLUORIDE

BACKGROUND OF THE INVENTION

1. Field of the Invention

This invention relates to a process for producing high purity silica, and more particularly, to a process which utilizes impure waste by-product silica and hydrogen fluoride to produce high purity silica.

2. History of the Related Art

Fluorine is evolved as silicon tetrafluoride ($SiF_4$) during the production of wet process phosphoric acid. In order to eliminate the potential for air pollution from the gaseous emission of $SiF_4$, phosphoric acid plants commonly react the $SiF_4$ with water to produce hydrofluosilicic acid (FSA) ($H_2SiF_6$) and silica ($SiO_2$). There are a number of known methods for producing FSA in wet process phosphoric acid plants, many of which produce a slurry of FSA, silica and water. Typically, this slurry is filtered to separate the liquid FSA and water from the solid silica. While there is a small market for FSA for use as a water treatment chemical, the silica, because of contained impurities, has usually been considered a waste by-product of little value.

A number of known processes use ammonia to produce silica. For example, related U.S. Pat. Nos. 5,165,907 and 4,981,654 to Chieng disclose methods of production of high purity silica and ammonium fluoride.

Silica is produced in the phosphate industry at various points in the process. In all cases, the silica produced contains a large amount of impurities and is discarded as a waste material.

In the production of phosphoric acid, phosphate rock is reacted with a mineral acid such as sulfuric acid. The sulfuric acid reacts with the calcium fluoride component of the phosphate rock to form hydrogen fluoride which in turn reacts with the silica in the phosphate rock to form silicon tetrafluoride. The silicon tetrafluoride reacts with the water to form fluosilicic acid and silica. About 25% of the fluorine contained in the rock escapes from the phosphoric acid reactor as fumes, in the form of silicon tetrafluoride. When these fumes are scrubbed with water to prevent their escape to the environment fluosilicic acid is formed as well as impure silica, which is discarded as a waste material.

When the phosphoric acid is concentrated from the reactor concentration of 28% to 40 or 54% $P_2O_5$, silicon tetrafluoride and hydrogen fluoride are vaporized and escape from the liquid phase. These vapors are scrubbed with water to recover the fluorine component as a 20–28% fluosilicic acid. During this recovery operation, should the mole ratio of hydrogen fluoride to silicon tetrafluoride in the vapors drop much below 2, an impure silica precipitates from the fluosilicic acid and will plug up the recovery equipment. Should the mole ratio be larger than 2, silica does not precipitate since any precipitated silica would react with the HF to form $SiF_4$.

Normal superphosphate is produced by the reaction of phosphate rock and sulfuric acid, while triple superphosphate is produced by the reaction of phosphate rock with phosphoric acid. In both of these reactions silicon tetrafluoride is released, and when these gases are scrubbed with water to prevent their escape to the environment, an impure silica is produced in large quantities.

Fluosilicic acid may be used in the production of aluminum fluoride. In this process, fluosilicic acid is reacted with aluminum hydroxide to form aluminum fluoride and a precipitate of silica, which is very impure, and discharged as a waste material. This type of precipitation of silica can be accomplished by reacting fluosilicic acid with many basic materials. The silica produced by this method contains large amounts of the impurities contained in the mother liquor.

One method of producing fluosilicic acid is to add sulfuric acid to a recycle stream of phosphoric acid. This addition of sulfuric acid decreases the solubility of the silicon tetrafluoride which is vaporized and then reacted with water to form fluosilicic acid and an impure silica.

There has been a need for a process for producing high purity silica which overcomes the deficiencies and limitations of the known processes.

SUMMARY OF THE INVENTION

The present invention has been made in view of the above-described limitations of the known processes and has as a primary object to provide a process for producing high purity silica by reacting by-product waste silica and hydrogen fluoride.

It is also an object of the present invention to provide a process of producing high purity silica by reacting by-product waste silica and hydrogen fluoride in the presence of water.

It is another object of the present invention to provide a method of producing high purity silica by reacting by-product waste silica and hydrogen fluoride in the presence of sulfuric acid.

It is still another object of the present invention to provide a method of producing high purity silica in a process in which hydrogen fluoride and silica are reacted to form a vaporous silicon tetrafluoride which is separated from a contaminant containing mother liquor.

To achieve the objects of the invention, the process for producing high purity silica comprises reacting by-product waste silica and hydrogen fluoride (HF) preferably in the presence of sulfuric acid and/or water, to release a vapor $SiF_4$ which is contacted with a high purity water to produce a slurry of high purity silica and high-purity hydrofluosilicic acid (FSA). The silica is subsequently separated from the high-purity hydrofluosilicic acid (FSA). The silica is recovered and the FSA may be converted into other useful materials, some of which may be recycled into other steps in the process. In the first stage of the process, the silica is reacted with HF, preferably in the presence of sulfuric acid or water, producing silicon tetrafluoride gas ($SiF_4$), which is released in a vaporous state away from the mother liquor, leaving most of the impurities in the mother liquor. The $SiF_4$ is contacted with pure water, in a clean environment, to form purified silica and FSA. A portion of the purified silica is then separated from the FSA, and washed to separately recover a high purity silica. The remaining FSA-silica slurry is preferably reacted with ammonia to produce additional purified silica and ammonium fluoride which may be reacted with lime and recycled back into earlier stages of the process.

BRIEF DESCRIPTION OF THE DRAWINGS

The above and other objects and advantages of the present invention will be readily apparent from the following detailed description of the preferred embodiments, particularly when read in conjunction with the accompanying drawing figures, in which.

DESCRIPTION OF THE PREFERRED EMBODIMENT

Figure 1:
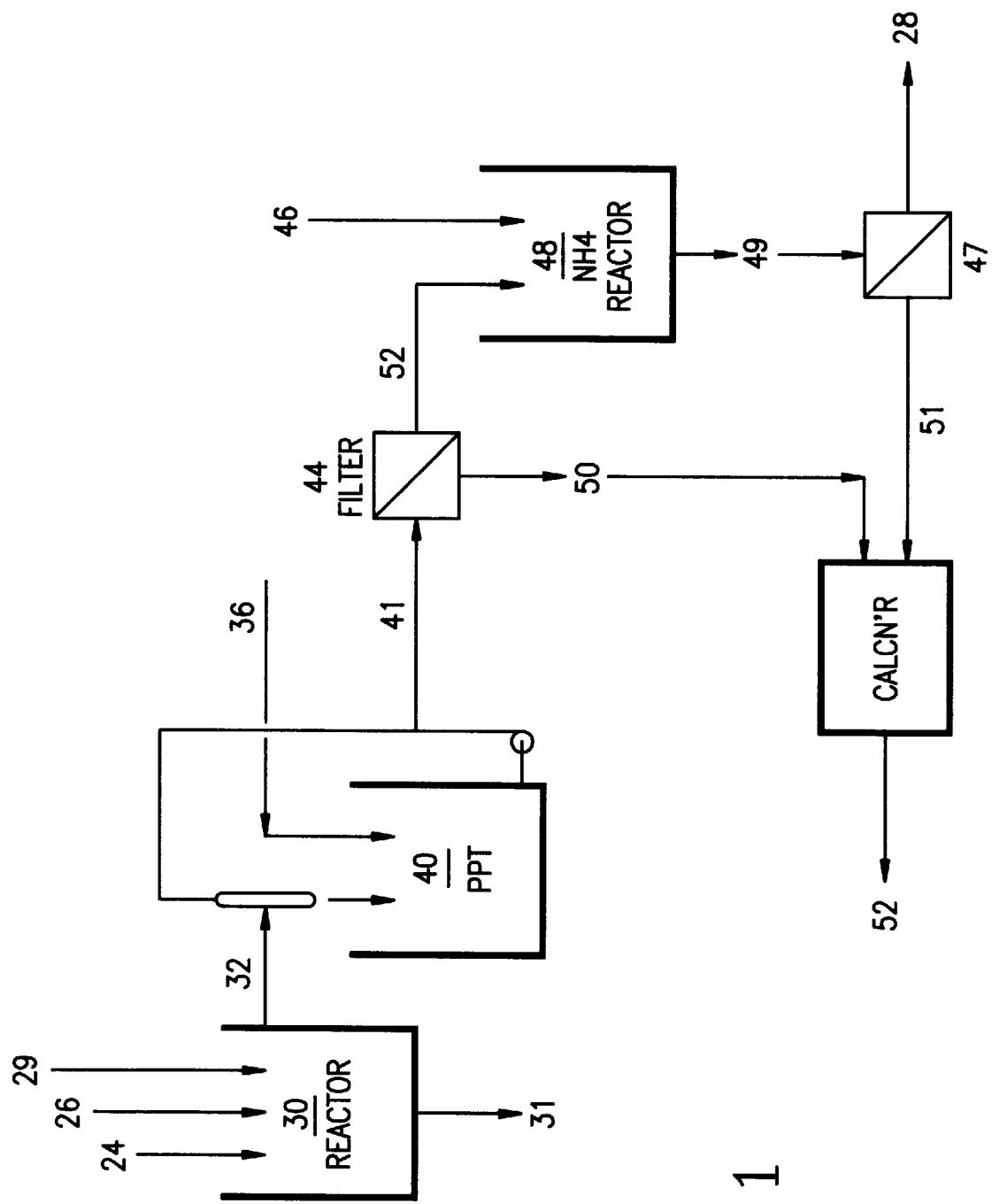
FIG. 1 is a schematic flow diagram showing an embodiment of a process for producing high purity silica which has been tested as part of a pilot scale program in accordance with the present invention.

The process of the present invention utilizes hydrogen fluoride (HF) to purify silica. The water utilized in the process should be of as high a purity as is economically possible.

In the process of the present invention, crude silica is preferably obtained from the conventional process of dissolving $SiF_4$ from a phosphoric acid reactor in water to produce hydrofluosilicic acid (FSA) and crude silica. The crude silica may alternatively be obtained from sand, silica gel or another active silica material. The silica used is preferably washed before beginning the reactive purification steps of the present invention. In a $SiF_4$ reactor, commercially pure HF, or a solution of HF, is reacted with the silica, preferably in the presence of sulfuric acid. The HF concentration can range from as low as about 5% by weight to as high as about 100%. The vaporous $SiF_4$ produced in the reactor is relatively insoluble in the reactor mass and exits the reactor as a very pure $SiF_4$ gas, leaving virtually all of the impurities behind in the mother liquor. Thus, the produced silica is purified by the steps of vaporizing the silica into $SiF_4$ and then separating the $SiF_4$ away from the impurities which remain contained in liquid.

Under the preferred process conditions, the only materials which enter the $SiF_4$ reactor are crude silica (generally containing less than about 1% impurities), pure hydrogen fluoride and sulfuric acid. Thus, only a small amount of impurities enter the reactor and, after reaction, substantially all of the impurities remain in the reactor mass, separate from the $SiF_4$ gas.

An advantage between the process of the present invention and other processes for the production of purified silica is that, in the present invention, the silica is purified by vaporizing it as silicon tetrafluoride rather than precipitating it out from an impure mother liquor. The vaporization of the silica is accomplished by reacting it with hydrogen fluoride to produce silicon tetrafluoride which is a gas and leaves the reactor as such. The produced silicon tetrafluoride gas is then reacted with water in a precipitator to produce silica and fluosilicic acid.

At least part of the silica is filtered from the FSA. The recovered silica is of a much higher purity than the starting crude silica.

There are several ways in which the process of the present invention can be run to react the hydrogen fluoride with the crude silica to produce the silicon tetrafluoride to be fed to the precipitator.

The attack of the silica by hydrogen fluoride is a slightly exothermic reaction and is preferably accomplished by adding the hydrogen fluoride to the reactor either as an aqueous solution or by being sparged into the reactor in the anhydrous form. It is preferred that the crude silica always be in excess of the stoichiometric amount of hydrogen fluoride present in the reactor to ensure that substantially all the fluorine added is converted to silicon tetrafluoride rather than fluosilicic acid. The reaction has been found to be very rapid and to reach completion in about 20 minutes at 70° C.

The addition of sulfuric acid, or oleum, to the reactor mass will greatly reduce the loss of hydrogen fluoride in the waste discharged from the reactor. When the concentration of sulfuric acid, in the reactor mass, is maintained at approximately 65%, the fluorine concentration is reduced to less than 2.0%. When this system is used, it is convenient to put the silica into the sulfuric acid so that the silica can be added as a silica-sulfuric acid slurry.

Calcium fluoride may be added to the reactor along with the sulfuric acid-silica slurry. Silicon tetrafluoride is formed by the insitu reaction of the calcium fluoride, silica and sulfuric acid, or oleum, in the reactor. The calcium fluoride reacts with the sulfuric acid to form the hydrogen fluoride which reacts with the silica to form silicon tetrafluoride. In this reaction, it is preferable to maintain a slight excess of silica in the reactor to assure that the hydrogen fluoride produced is converted to silicon tetrafluoride. The sulfuric acid concentration is maintained at approximately 65% to reduce the loss of any fluorine. Again, the silica is fed to the reactor as a slurry in the sulfuric acid. This step of producing the HF eliminates the need of purchasing and storing hydrogen fluoride. While the calcium fluoride may be obtained from natural fluospar, from another natural source, or from any other source, it is preferably obtained by recovery from other steps in the process.

In all of the above-described optional ways for reacting the HF with the crude silica, the produced vaporous silicon tetrafluoride is directed into the precipitator where it is converted to fluosilicic acid and purified silica.

The crude silica may be reacted with anhydrous hydrogen fluoride. However, this method is less preferable because the reaction would have to be conducted in a pressure vessel. The hydrogen fluoride would be maintained as a liquid under pressure and the silicon tetrafluoride vapors allowed to escape through a reflux condenser while the hydrogen fluoride would be returned to the reactor.

The vaporization and purification of the silica may be done in stages to achieve a maximum purity. The purified silica from the steps described above may be put into a second reactor where the silica is contacted with hydrogen fluoride a second time to produce a more purified silicon tetrafluoride to be contacted with additional pure water to produce an even more purified silica. This process can be repeated over and over as necessary until a desired purity is achieved.

There are other steps, or combinations of the above, which can be utilized as part of the process of the present invention to react silica with hydrogen fluoride to produce silicon tetrafluoride. A key aspect of this process is the vaporization of the silica away from its impurities by converting it to silicon tetrafluoride gas. By so doing, the silica is freed from its impurities thus allowing the production of a very pure silica.

FIG. 1 illustrates a first embodiment of a process for producing a high purity silica which has been run as part of a pilot scale program for testing the effectiveness of the present invention. Silica 26, preferably obtained as a by-product of phosphoric acid processing is introduced into reactor 30. Preferably, sulfuric acid is added through stream 24 to be combined with the solid silica from stream 26 in the reactor 30. Optionally, the silica 26 and sulfuric acid 24 may be combined earlier and then conveyed to and introduced into reactor 30 together as a slurry.

In the reactor 30, which acts as a $SiF_4$ generator, the wet silica slurry made up of the combination of streams 24 and 26 is reacted with hydrogen fluoride from stream 29 to produce gaseous $SiF_4$ in stream 32, in accordance with the following reaction equation:

$$SiO_2 + 4\ HF \rightarrow SiF_4 + 2\ H_2O \tag{1}$$

The gaseous $SiF_4$ in stream 32 is conveyed to the $SiO_2$ precipitator 40, while the liquor produced in the generator 30 contains virtually all of the impurities originally contained in the impure silica. The liquor produced in the $SiF_4$ generator 30 may be recycled to earlier steps in the processing of phosphoric acid and its by-products or alternatively disposed of through waste stream 31. The source of the HF may be the product of a reaction of $CaF_2$ and additional sulfuric acid, or $CaF_2$ and other acids such as hydrochloric acid or mixtures of acids such as sulfuric and phosphoric acid. The concentration of the HF may range from about 5% to, preferably, about 100% or anhydrous hydrogen fluoride.

In the $SiO_2$ precipitator 40, the $SiF_4$ from stream 32 is reacted with water from stream 36 to produce a solid silica and FSA slurry. The resulting slurry 41 is separated by filter 44 into the FSA in stream 52 and the silica in stream 50. A portion, typically about two-thirds, of the original silica is not filtered out of the slurry by filter 44 and remains within stream 52 as FSA. This separation is preferably conducted by filtration in filter 44 or optionally by means of centrifugation, decantation or another suitable separation technique. The silica filter cake in stream 50 is preferably then washed with water to remove any remaining hydrofluosilicic acid, thus providing the high purity silica product of stream 50. Spent filter wash water may be recycled to the $SiO_2$ reactor 40, or alternatively discarded. The water fed to the $SiO_2$ reactor from stream 36 and any water used for washing the silica filter cake are preferably of a high-purity, as any impurities introduced with the water may contaminate the high purity silica product.

Stream 52, containing FSA and part of the silica not removed by filter 44, is preferably reacted with ammonia from stream 46 in ammonia reactor 48 to produce a slurry 49 of silica and ammonium fluoride in accordance with the following equation:

$$H_2SiF_6 + 6NH_3 + 2\ H_2O \rightarrow 6NH_4F + SiO_2 \tag{2}$$

Slurry 49 is filtered by filter 47 into silica in stream 51 and ammonium fluoride in stream 28.

The silica in stream 51, and optionally the silica in stream 50, are passed through a calciner 45 to remove, by thermal decomposition, any remnants of ammonium fluoride attached to the silica particles.

The silica product 52 is much purer than the starting crude silica 26. Also, it has been possible using the process, to produce silica particles which are substantially spherical and between about 1.0 to about 25.0 microns in diameter.

The process described above produces a high purity silica product. There may, however, be situations where an even higher degree of purity is required. In such cases, the high purity silica of stream 52 can be processed through another series of purification steps including reacting the high purity silica with additional HF in the presence of additional water or sulfuric acid in a second $SiF_4$ generator. The second $SiF_4$ generated can be reacted with more high-purity water in a clean environment in a second $SiO_2$ reactor to produce a second slurry of even higher-purity silica and additional high-purity FSA, each of which is separately recovered. The process can be further repeated over and over as is necessary to produce yet further purification of the silica. The purified silica is preferably filtered with high-purity water to produce a final product.

Figure 2:
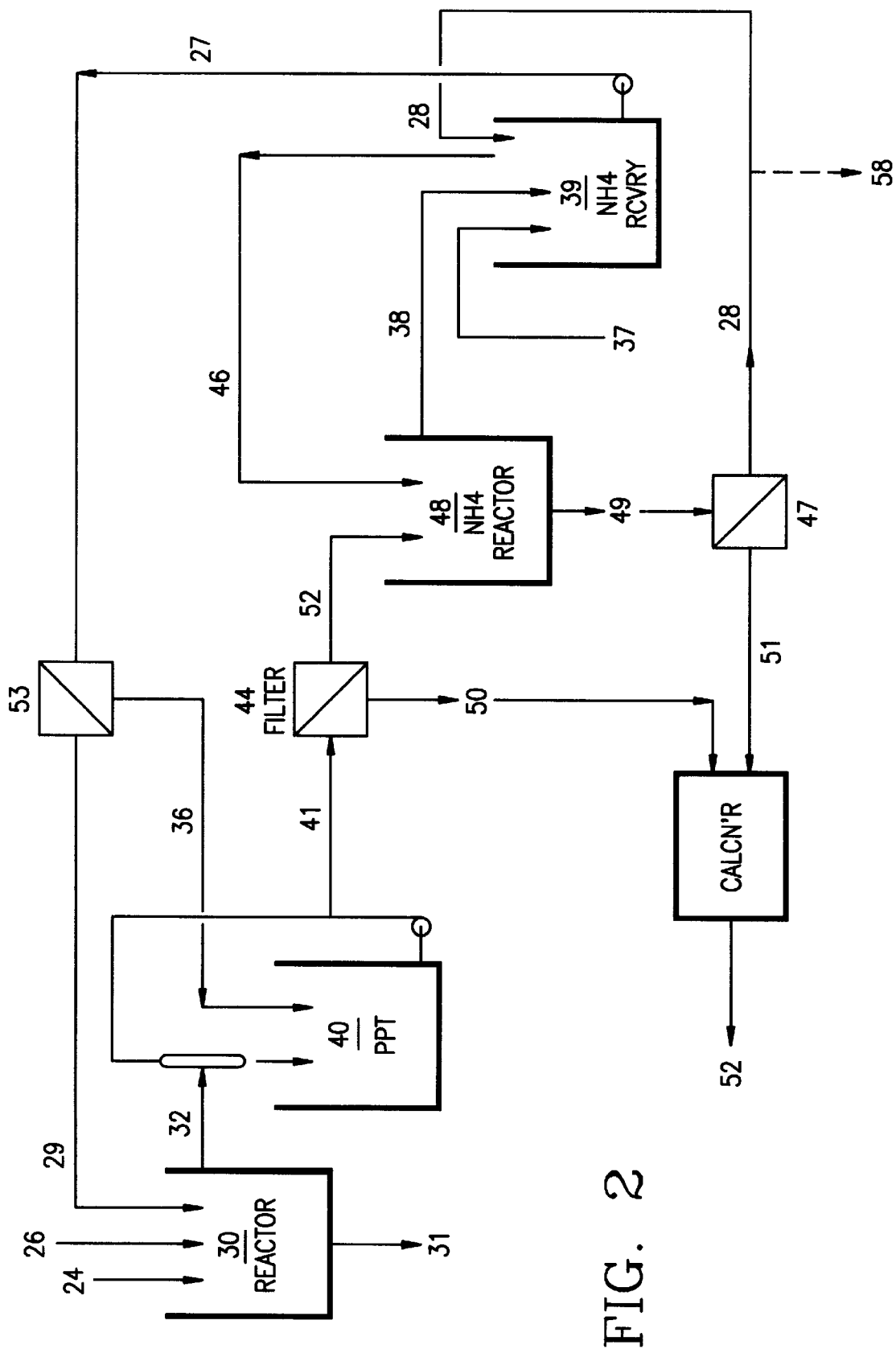
FIG. 2 is a schematic flow diagram showing a preferred full-scale embodiment of a process for producing high purity silica in accordance with the present invention.

FIG. 2 shows a second embodiment of a process for purifying an impure silica to a high-purity silica in accordance with a preferred full-scale version of the invention.

This process efficiently optimizes the utilization of several of the by-products of the process.

Silica 26, preferably obtained as a waste by-product from a wet process phosphoric acid plant in stream 26 is conveyed to the $SiF_4$ reactor 30, where sulfuric acid is preferably added from stream 24 to create a sulfuric acid/silica slurry in or before the reactor 30. HF is added to reactor 30 through HF stream 29. The silica slurry and the HF of stream 29 are reacted in the $SiF_4$ generator 30 to produce a gaseous $SiF_4$ stream 32 and a liquid mother liquor stream 31. Water may be added with the HF in stream 29. The gaseous $SiF_4$ stream 32 is directed to $SiO_2$ precipitator 40 where it is reacted with water from water stream 36 to produce a $SiO_2$-FSA slurry 41. The $SiO_2$/FSA slurry 41 is separated and washed in filter 44 to produce a high purity $SiO_2$ product 50 and a high-purity FSA stream 52. Any spent wash may be used as make up water for the $SiO_2$ precipitator 40 or alternatively disposed. A portion of the original silica is not filtered out of the slurry by filter 44 and remains contained within stream 52 as FSA. The silica filter cake in stream 50 is preferably then washed with water to remove any remaining hydrofluosilicic acid, thus providing the high purity silica product of stream 50.

Stream 52, containing FSA and part of the silica not removed by filter 44, is preferably reacted with ammonia from stream 46 in ammonia reactor 48 to produce a slurry 49 of silica and ammonium fluoride, in accordance with equation (2) above.

Slurry 49 is filtered by filter 47 into silica in stream 51 and ammonium fluoride in stream 28. The ammonium fluoride stream 28 can be directed to the $NH_4$ recovery tank #39, or it can be separately recovered in stream 58 and sold as an ammonium fluoride product.

The silica in stream 51, and optionally the silica in stream 50, are passed through a calciner 45 to remove any remnants of ammonium fluoride attached to the silica particles.

Lime from stream 37 can be combined, in ammonia recovery apparatus 39, with recovered ammonium fluoride in stream 38 from reactor 48 and recovered ammonium fluoride in stream 28 to recycle ammonia in stream 46, which is re-used for ammonia reactor 48. The equation for this part of the process is as follows:

$$2NH_4F + CaO \rightarrow CaF_2 + 2NH_3 + H_2O \tag{3}$$

Calcium fluoride in stream 27 is filtered in filter 53 to form damp $CaF_2$ in stream 29 which is converted to HF in the original reaction of HF with the starting crude silica.

Again, the process can be repeated for further purification of the silica.

EXAMPLE

Production of Silica and Fluosilicic Acid

A slurry of 188.0 grams of impure silica containing 40.15% Si, and 1058.4 grams of 98% $H_2SO_4$ was metered into a stirred polypropylene vessel. Concurrently 220.5 grams of a 49% hydrogen fluoride solution was metered into the same vessel over a period of one hundred five minutes at a reaction temperature of 58° C. It was not necessary to heat or cool the bench scale reactor to maintain the reaction temperature and 263.2 grams of silicon tetrafluoride was produced, as a vapor, and discharged from the reactor into the precipitator containing 520 grams of deionized water. The amount of silica precipitated in the precipitator was found to be 53.8 grams and 743.2 grams of 34.6% fluosilicic acid was produced. Approximately 26.3 grams of fluorine and 2.6 grams of Si were discharged with the spent sulfuric acid.

Following is the composition of the fluosilicic acid: 34.6%. F-27.36, Fe-0.0004, Mg-<0.0001, Ca-0.0010, Cd-<0.0001, Na-<0.0001m K-<0.0001, Zn-0.0001, Co-0.0001, Cu-<0.0001, S04-0.0014, As-0.0002. The silica analyzed 46.6% Si.

The fluosilicic acid was neutralized with ammonia to a pH of 9.0 to yield 1421.2 grams of a 26.1% ammonium fluoride solution and an additional 124.6 grams of silica.

The analysis of the silica precipitated during the production of the fluosilicic acid and of the silica produced by the neutralization of the fluosilicic acid by ammonia give the following results in ppm:

|  | Ca | Fe | Al | MG | Na | F |
|---|---|---|---|---|---|---|
| First Precipitate | 1.1 | 0.26 | <5.0 | 1.5 | <0.5 | 3,652 |
| Ammonia Precipitate | 1.1 | 0.29 | <5.0 | <0.5 | <0.5 | 206 |

All other elements were not detectable on the atomic absorption unit.

Experiments were performed to determine the best way to reduce or eliminate the fluorine as a contaminate. It was found the fluorine existed in the silica as an ammonium fluoride and could be vaporized by heating it to a temperature in excess of 400° C. When this was done, the fluorine content dropped to less than 2 ppm.

Although the process of the present invention can be operated with a relatively high impurity level, the starting crude silica used in the process should already be as pure as possible, consistent with good process economics. Silica with a 10% impurity level has been used in the process successfully. Should it be desired to reduce or eliminate certain impurities such as radioactive alpha emissions, raw materials without such undesirable impurities should be selected.

The temperature within the first reactor can be as high as 100° C. or as low as 50° C. The optimum temperature would be as high as possible to obtain a good reaction speed and low enough to keep the amount of $SO_4$ vaporized from the reactor into the precipitator to a minimum. It has been found that a temperature of 75° to 85° C. meets these conditions. The reaction is slightly exothermic and therefore cooling coils may be provided when larger scale equipment is used, so as to maintain the temperature at the desired level.

Sulfuric acid is preferably added to the first reactor to maintain a concentration of 65 to 75% free sulfuric acid. At this concentration the solubility of the hydrogen fluoride is at a minimum, and the reaction of the silicon tetrafluoride with free water to form FSA in the first reactor is kept to a minimum. A relatively dry gas is produced, preventing the precipitation of silica prior to its reaching the precipitator.

The stoichiometric ratio of silica to fluorine in the first reactor is preferably slightly high on the silica side, keeping the use of the expensive hydrofluoric acid to a minimum and reducing the amount of fluorine in the waste sulfuric acid.

The concentration of the fluosilicic acid in the precipitator can be anywhere from about 5% to 40% fluosilicic acid. The system functions well at 20 to 35% fluosilicic acid and is preferably operated at about 28% fluosilicic acid.

The market for ammonium fluoride is very limited, therefore it is beneficial to reuse the expensive fluorine used in the reaction. This may be accomplished by neutralizing the ammonium fluoride with lime to form calcium fluoride, while releasing the ammonia as a vapor in accordance with equation (3) above. The ammonia can then be recycled back to the ammonium precipitation step. The calcium fluoride is reacted with sulfuric acid to produce a 92% hydrogen fluoride gas stream, as taught in U.S. Pat. No. 5,180,569. This hydrogen fluoride gas stream can then be used to react with the silica to produce the silicon tetrafluoride in the first reactor. These recycle steps will reduce the cost of the product and amount of waste that has to be treated.

Precipitates generally contain impurities from the mother liquor. By vaporizing the silica in the form of $SiF_4$, all or substantially all of the impurities are left in the mother liquor. The only important impurity remaining is fluorine, which typically can be washed away with high-purity water.

Under current economic conditions, the price of hydrogen fluoride, at approximately $550.00 per ton, may make it economically impractical to purify silica in the above-described manner in most situations. The cost for the raw materials alone would be approximately $1.10 per pound. However, where low cost hydrogen fluoride is available and fluosilicic acid can be reused, the process of the present invention is economically feasible, as the cost of the pure silica is approximately $0.11/lb.

The foregoing description of the preferred embodiments of the invention has been presented to illustrate the principles of the invention and not to limit the invention to the particular embodiment illustrated. The scope of the invention is defined by the embodiments encompassed within the following claims and their equivalents.

What is claimed is:

1. A process for the purification of silica, comprising the steps of:
    reacting a first-purity silica which contains impurities with hydrogen fluoride in the presence of sulfuric acid to produce gaseous silicon tetrafluoride and a mother liquor in which said impurities are contained;
    separating said gaseous silicon tetrafluoride from said mother liquor, said impurities remaining in said mother liquor;
    contacting the removed gaseous silicon tetrafluoride with water substantially free of impurities to form a slurry of hydrofluosilicic acid and a second-purity silica of a purity higher than said first-purity silica;
    separating a first part of said second-purity silica from said slurry of hydrofluosilicic acid and second-purity silica; and
    recovering said first part of said second-purity silica.

2. The process of claim 1, further comprising the steps of, after said step of separating a first part, reacting said hydrofluosilicic acid with ammonia to produce a silica-ammonium fluoride slurry;
    separating a second part of the silica from said silica-ammonium fluoride slurry; and
    recovering said second part of the silica.

3. The process of claim 2, further comprising the step of calcining said second part of the silica to remove substantially all of any ammonium fluoride remaining with said second part of the silica.

4. The process of claim 1 wherein said step of separating a first part of said second-purity silica is conducted by filtering said second-purity silica from liquid hydrofluosilicic acid.

5. The process of claim 1 wherein said step of contacting is conducted in a clean environment to substantially prevent airborne impurities from entering the process.

6. The process of claim 2 further comprising the step of washing said first and second parts of silica, said step of washing being conducted utilizing water substantially free of impurities.

7. The process of claim 1 wherein said first-purity silica is obtained from one of the following sources: waste from a phosphoric acid process, sand and silica gel.

8. A product produced by the process of claim 1, the product comprising a plurality of substantially spherical silica particles.

9. The product of claim 8 wherein said substantially spherical silica particles are about 1.0 to about 25.0 microns in diameter.

10. The process of claim 1, further comprising the steps of:

contacting said recovered second-purity silica with hydrogen fluoride in the presence of sulfuric acid to produce a second gaseous silicon tetrafluoride and a second mother liquor;

separating said second gaseous silicon tetrafluoride from said second mother liquor, substantially all of any impurities remaining in said second mother liquor;

contacting said second gaseous silicon tetrafluoride with water substantially free of impurities to form a third-purity silica product and a second hydrofluosilicic acid product, said third-purity silica being of a higher purity than said second-purity silica;

separating said third-purity silica from said second hydrofluosilicic acid; and washing said third-purity silica to increase the purity thereof.

11. The process of claim 1 further comprising the steps of:

prior to the step of reacting said first-purity silica which contains impurities with said hydrogen fluoride, contacting calcium fluoride with sulfuric acid and said first purity silica, said calcium fluoride being converted in-situ into said hydrogen fluoride which is used for said step of reacting with said first-purity silica.

12. The process of claim, 11 wherein said calcium fluoride is produced by reacting an ammonium fluoride slurry produced as a by-product of the process with lime to produce said calcium fluoride.

13. A process for the purification of silica, comprising the steps of:

obtaining a first-purity silica containing impurities as a by-product from a wet process phosphoric acid process;

reacting said first-purity silica with hydrogen fluoride in the presence of sulfuric acid to minimize the formation of hydrofluosilicic acid to produce a gaseous silicon tetrafluoride and a mother liquor containing said impurities;

separating said gaseous silicon tetrafluoride from said mother liquor, said impurities remaining in said mother liquor;

contacting the removed gaseous silicon tetrafluoride with water substantially free of impurities to form a slurry of hydrofluosilicic acid and a second-purity silica of a purity higher than said first-purity silica; and separating said second-purity silica from said hydrofluosilicic acid.

14. A product produced in the process of claim 13, the product comprising a plurality of substantially spherical silica particles.

15. The product of claim 14 wherein said substantially spherical silica particles are about 1.0 to 25 microns in diameter.

16. The process of claim 13, further comprising the step of reacting silicon tetrafluoride produced from the wet phosphoric acid process with water to produce hydrofluosilicic acid and said first-purity silica.

17. A process for increasing the purity of silica obtained from a process for preparing wet process phosphoric acid, comprising the steps of:

reacting said silica with hydrogen fluoride in the presence of sulfuric acid to minimize the formation of hydrofluosilicic acid for an amount of time sufficient and at a temperature effective to produce gaseous silicon tetrafluoride and a mother liquor containing impurities;

separating said gaseous silicon tetrafluoride from said mother liquor with the impurities remaining in said mother liquor;

contacting said gaseous silicon tetrafluoride with water substantially free of impurities in a clean environment for an amount of time sufficient and at a temperature effective to form purified silica and hydrofluosilicic acid;

separating said purified silica from said fluosilicic acid to produce a separated purified silica and hydrofluosilicic acid; and washing said separated purified silica with water substantially free of impurities to produce a washed purified purity silica.

18. A product produced in the process of claim 17, the product comprising a plurality of substantially spherical silica particles.

19. The product of claim 16 wherein said substantially spherical silica particles are about 1.0 to about 25 microns in diameter.

* * * * *